United States Patent Office 3,344,803
Patented Oct. 3, 1967

3,344,803
DEVICE FOR CONNECTING AND SEALING-OFF BETWEEN TWO SECTIONS OF A PIPELINE FOR CONVEYING LIQUEFIED GAS
Pierre Charles, Sceaux, Camille Prevost, Le Chesnay, and Olivier Testard, Clamart, France, assignors to Commissariat a l'Energie Atomique, Paris, France
Filed Nov. 4, 1965, Ser. No. 511,562
Claims priority, application France, Nov. 19, 1964, 995,512
4 Claims. (Cl. 137—375)

This invention applies to pipelines for conveying liquefied gas at very low temperature and consisting of sections coupled end to end, each section comprising an inner pipe through which the liquefied gas circulates and an outer pipe coaxial with the inner pipe and forming with said inner pipe a leak-tight annular space in which a vacuum is created. The liquefied gas which circulates within the inner pipe is thermally insulated from the surrounding atmosphere by means of the vacuum thus produced. Pipelines of this type have an advantage in that the different sections can be taken apart without releasing the vacuum which is maintained within each section.

It is known to employ in pipelines of this type devices for connecting and sealing-off between two sections and comprising a valve seating which is integral with the pipe for supplying liquefied gas, a valve which is movable within an extension of said pipe and a liquefied gas exit pipe, the complete assembly being surrounded by a tubular casing which is coaxial with and connected in leak-tight manner to the supply pipe, exit pipe and extension. In order to ensure thermal insulation of the cold portions, a vacuum is produced within the leak-tight volume which is delimited by the casing and the two pipes and the extension.

When the valve seating of a device of this type is worn, it proves necessary in order to replace the seating to release the vacuum which is created inside the casing prior to uncoupling the liquefied gas supply pipe with which said valve seating in integral.

An essential object of the present invention is to remove the disadvantage referred-to by making the valve seating accessible without releasing the vacuum.

To this end, the invention proposes a device for connecting and sealing-off between two sections of a liquefied-gas pipeline of the type comprising in the case of each section an inner pipe for the circulation of liquefied gas and an outer pipe coaxial with the inner pipe and forming with said inner pipe a leak-tight annular vacuum space, wherein said device essentially comprises disconnectable means for providing a leak-tight coupling between the cooperating terminal portions of the two sections, the diameters of said terminal portions being such that the first section is slidably fitted within the second section, cooperating means provided on each of said two sections for applying a clamping force on a seating element as and when said two sections are brought together for the purpose of coupling, and a control member which passes in leak-tight manner through the outer and inner pipes of said second section so as to apply against said seating element a member for sealing-off the inner pipe of said first section.

In accordance with a particular form of embodiment of the invention, the two pipe sections are disposed at right angles to each other and the inner pipe of the second section opens into a cylindrical chamber which is placed in the line of extension of said first section and which contains the sealing-off member, said sealing-off member being provided with means for guiding the movement thereof within said chamber.

The seating element can thus be advantageously clamped between the sliding terminal portion of the first section and an annular shoulder of said chamber.

In accordance with the invention, the replacement of the seating element when this latter is worn is carried out both simply and rapidly after interruption of the circulation of liquefied gas by disassembling means for providing a leak-tight coupling between the cooperating terminal portions of the two sections and by a subsequent longitudinal displacement of the first section so as to withdraw said first section from the terminal portion of the second section and thus provide access to the seating element. A new seating element can then be re-fitted. All of these operations are carried out without releasing the vacuum which is maintained between the outer and inner pipes of each section.

Reference being made to FIGS. 1 to 3 of the accompanying drawings, the description which now follows relates to one particular form of embodiment of the device in accordance with the invention which is chosen by way of example, without any limitation being implied.

Figure 1:
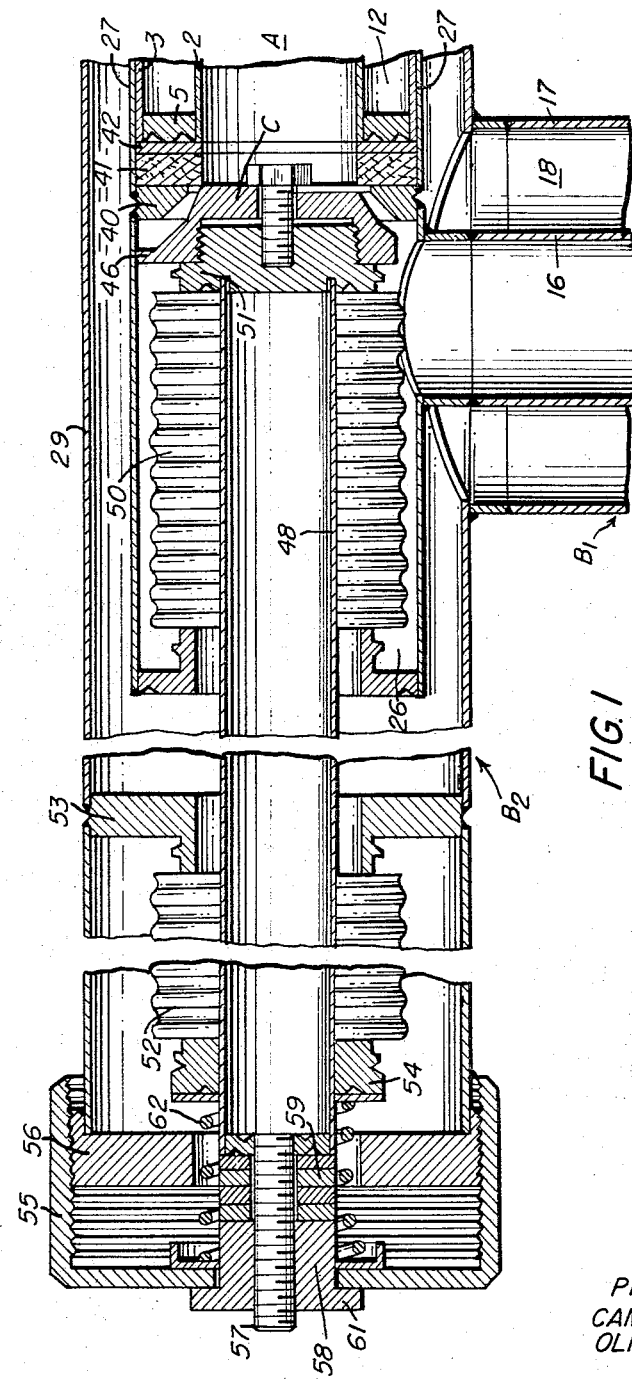
FIG. 1 shows a first portion of the device herein described which comprises in particular the control member.

The particular device described is employed for the purpose of connecting a distribution pipe to a feed-pipe which is provided on a liquefied gas storage tank but not shown in the drawings. The device essentially consists of two sections A and B which are each provided with separate vacuum insulation and the coupling of which produces clamping action on a seal which forms the seating of a plug valve C which is carried by the second section B.

The first section A comprises an outer pipe 1 and an inner pipe 2 which are joined together at one end by a tube 3; said tube is coaxial with said inner and outer pipes and forms the male skirt which is intended to fit within the cooperating terminal portion of the second portion B. The male skirt 3 is welded at one end to a ring 4 which is in turn welded to the outer pipe 1 and, at the other end, to a ring 5 which is welded to the extremity of the inner pipe 2.

The inner pipe 2 is welded at its other extremity to a ring 6 which is adapted to slide within an intermediate tube 7, said tube being in turn joined by means of a welded ring 8 to the extremity of the outer tube 1. Said tube 7 forms in conjunction with the extremity of the outer pipe 1 a female skirt by means of which the section A can be connected to the feed-pipe of a liquefied gas storage tank. The end of the tube 7 is welded to a ring 9 which is slidably fitted on the inner pipe 2. A bellows seal 11 connects the rings 9 and 6 to each other and thus ensures leak-tightness of the joint between the inner pipe 2 and the tube 7 while nevertheless permitting of longitudinal expansion of said pipe relatively to said tube under the action of temperature variations.

The outer pipe 1, the inner pipe 2, the male skirt 3 and the tube 7 of the female skirt form together a leak-tight volume 12 in which a vacuum can be created. Accordingly, a valve 14 is fitted in the outer pipe 1 so as to permit the connection of a vacuum pump and a mass of activated charcoal 15 serves to maintain the vacuum which has thus been produced.

The second section B of the device in accordance with the invention is also composed of two coaxial pipes which can be seen in FIG. 1, namely an inner pipe 16 through which the liquefied gas circulates and an outer pipe 17 providing a vacuum space 18 around the inner pipe 16. The assembly of both pipes forms two perpendicular branches: one of said branches, namely B1, serves to convey liquefied gas towards the utilization points whereas the other branch B2 contains the plug valve C and its control members. Said second branch B2 is intended to be placed in the line of extension of the first section A and is provided with a female terminal portion which is designed to accommodate the male skirt 3.

The inner pipe 16 of the branch B1 as represented vertically in FIG. 1 is fitted with a bellows expansion seal 22 whilst the outer pipe 17 is fitted with a valve 23 in order to connect an apparatus for exhausting air from the leak-tight annular space which is limited by the outer and inner pipes. A mass of activated charcoal 24 is placed inside said space for the purpose of maintaining the vacuum therein. The lower end of said branch B1 forms a male skirt 25 and this latter is designed to accommodate the female skirt of the following section of the distribution pipe which is also made up of two coaxial pipes forming a leak-tight annular vacuum space.

In the horizontal branch B2, the inner pipe 16 forms a cylindrical chamber 26 in which the valve C is movably fitted. Said cylindrical chamber 26 has an extension in the form of a female skirt 27, the internal diameter of which is equal, with due allowance made for clearance, to the external diameter of the male skirt 3. Said skirt 27 is welded at the extremity thereof to a ring 28 which is in turn welded to the extremity of the outer horizontal tube 29 which is coaxial with the chamber 26.

The assembly of the two sections A and B or, more exactly, of the tube 29 and pipe 1, is effected by means of two rings 30 and 31 having screw-threads of opposite pitch. The ring 30 is slidably fitted over the male skirt 3 and is screwed within the ring 28 at the extremity of the female skirt 27. Said ring 30 thus exerts pressure on a washer 32 which clamps a sealing point 33 at the bottom of an annular channel formed by an annular shoulder 34 of the ring 28 and by the male skirt 3. The ring 30 is provided with an outer bearing surface 35 which forms an annular abutment for the ring 31 and this latter is screwed onto a ring 36 which is welded onto the outer pipe 1 of the section A.

When the two sections occupy the assembly position as thus defined, the terminal ring 5 of the section A comes opposite an annular shoulder 40 of the female skirt 27. Between the ring 5 and the annular shoulder 40 is inserted an annular seal 41 which forms the seating of the plug valve C. A washer 42 is interposed between the ring 5 and the seating 41 in order to ensure that uniform pressure is exerted on this latter in spite of the presence of weld holes in the ring 5.

The plug valve C is of frusto-conical shape. The rear portion thereof forms a circular flange 46 for guiding the valve within the cylindrical chamber 26. The guide flange 46 is interrupted at the level of the inner pipe 16 of the vertical branch B1 in order to permit the passage of liquefied gas when the device is in the open position.

The valve C is screwed onto the end of a cylindrical control rod 48. Said control rod 48 is disposed coaxially within the cylindrical chamber 26 and passes in leak-tight manner through the leak-tight vacuum space by means of bellows expansion seals. In fact, a first bellows expansion seal 50 serves to connect its end-portion 51 which carries the valve C to the opposite extremity of the chamber 26 and thus ensures leak-tightness of the chamber 26 containing liquefied gas with respect to the annular vacuum space. An annular ring 53 which is welded to the interior of the tube 29 is connected to a ring 54 by means of a second bellows expansion seal 52. Said ring 54 is welded to the rod 48 at a point in the vicinity of the second extremity which is located outside the device; the bellows seal 52 thus ensures leak-tightness between the vacuum space and the air of the surrounding atmosphere.

A nut 55 which serves to actuate the control rod 48 is screwed onto a threaded ring 56 which is welded to the extremity of the tube 29; said nut has an axial bore which provides a passageway for the rod 48. The control rod is provided with a threaded portion 57 on which is screwed a nut 58 which serves to adjust the length of the rod 48 by modifying the number of washers 59 which are interposed between the nut 58 and the rod itself. The nut 58 also forms a bearing shoulder 61 which cooperates with the nut 55 so as to permit the opening of the valve by unscrewing said nut.

A spring 62 which is fitted around the control rod 48 is compressed between the base of the nut 55 and the ring 54 which is welded to the control rod 48. By virtue of said spring, the device can operate as a regulating valve. Accordingly, the plug valve 45 is displaced from its seating 41 as soon as the pressure of liquefied gas within the section A becomes greater than the force exerted in the opposite direction by the spring 62.

Figure 2:
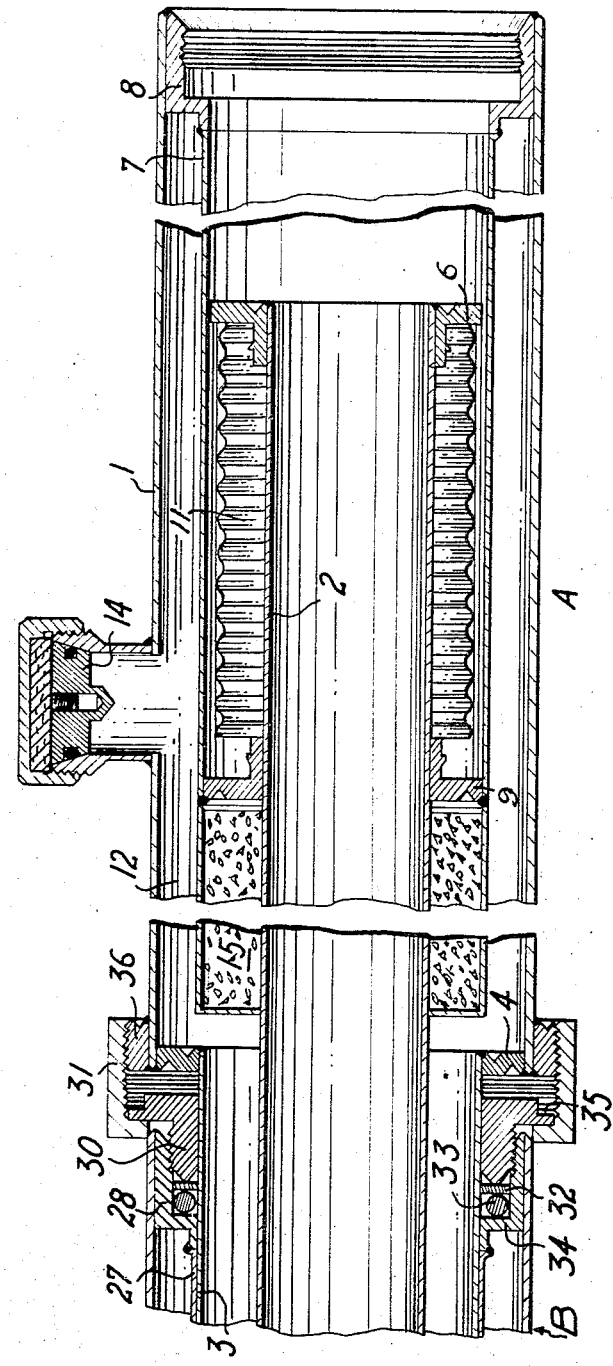
FIG. 2 shows the right-hand portion of the device, the left-hand portion of which is shown in FIG. 1.
Figure 3:
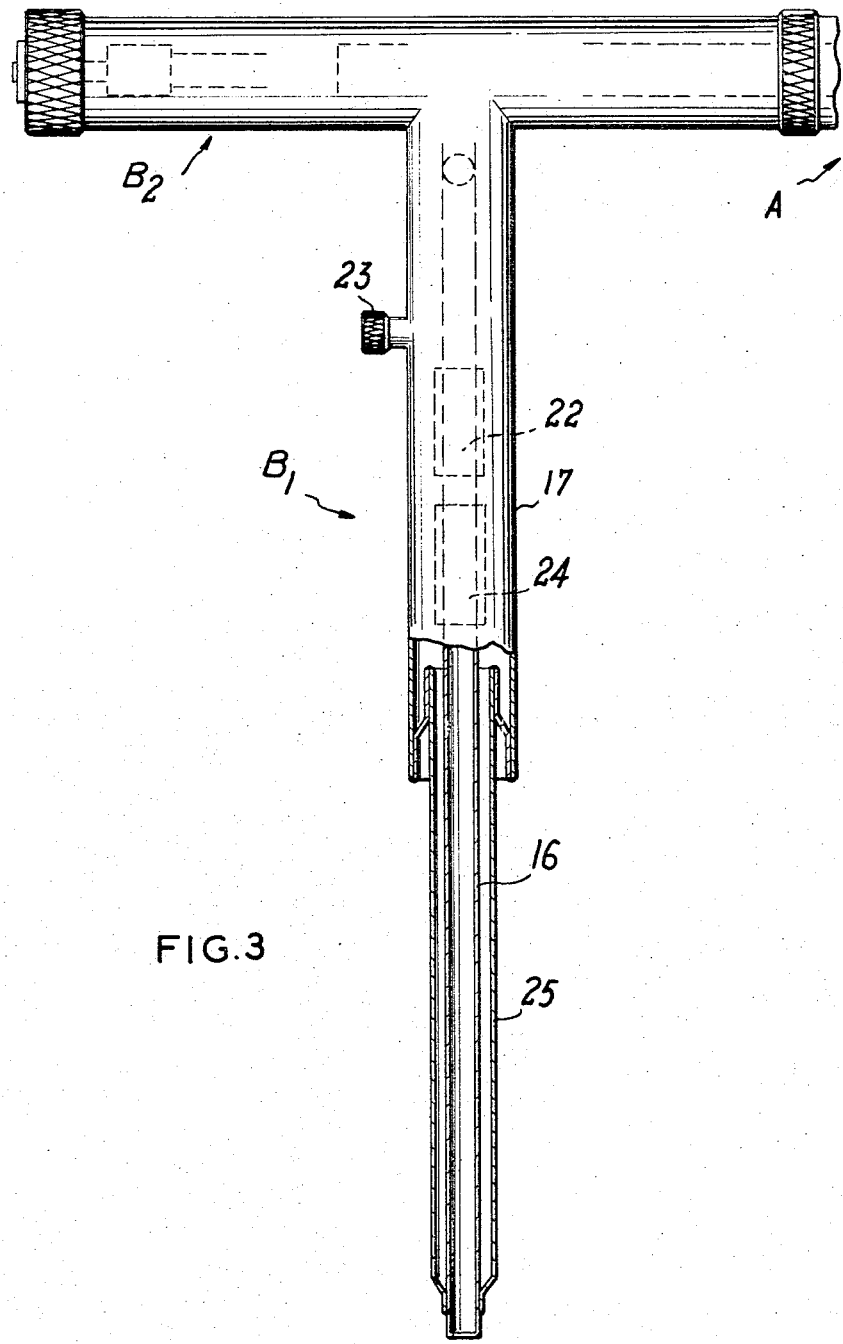
FIG. 3 is a diagrammatic view of the complete device, the bottom portion of which is shown in cross-section.

The operation of the device in accordance with the invention is apparent from the foregoing description. In the assembly position of the device which is shown in FIGS. 1 and 2, said device constitutes a regulating valve assembly, the opening of which under pressure is controlled by unscrewing of the nut 55 which is accompanied in its movement by the longitudinal displacement of the control rod 48 since said nut is applied against the annular bearing shoulder 61 of the nut 58.

When the seal 41 which forms the seating of the valve C is worn, it can readily be replaced without consequently releasing the vacuum which is created between the two coaxial pipes of each section. (It should also be pointed out that the annular shoulder 40 against which the seal 41 is applied has a frusto-conical shape which is comparable with that of the valve C, with the result that said shoulder plays a part in ensuring closure of the valve when the seal 41 becomes deficient.) After the device has been isolated from the liquified gas storage tank which is located upstream, the ring 31 is unscrewed, followed by the ring 30. The male terminal skirt 3 and female terminal skirt 27 are then caused to slide so as to separate the two sections and thus enable access to be gained to the seal 41 and washer 42.

When a new seal has been fitted in position, the washer 41 is again inserted, whereupon the two sections are re-assembled in a sequence of operations which is reverse to the preceding, namely, interengagement of the two sections, screwing of the ring 30 so as to clamp the seal 33 which ensures leak-tightness between the interior of the pipe 2 and the surrounding atmosphere, screwing of the ring 31 onto the tube 1 so as to ensure effective clamping of the seal 41.

As will be readily understood, the invention is not limited in any sense to the particular form of embodiment of the device as hereinabove described but, on the contrary, is intended to include within its scope any alternative form of either all or a part of the arrangements described.

What we claim is:

1. Device for connecting and sealing-off between two sections of a liquefied-gas pipeline of the type in which each section has an inner pipe for the circulation of liquefied gas and an outer pipe coaxial with the inner pipe and forming with said inner pipe a leak-tight annular vacuum space, said device comprising disconnectable means providing a leak-tight coupling between the cooperating terminal portions of the two sections, the diameters of said terminal portions being such that the first section is slidably fitted within the second section, cooperating means provided on each of said two sections applying a clamping force on a seating element when said two sections are brought together for coupling, and a control member which passes in leak-tight manner through the outer and inner pipes of said second section to apply against said seating element a member for sealing-off the inner pipe of said first section.

2. Device in accordance with claim 1, wherein leak-tightness between the control member and the outer and inner pipes of the second section is ensured by means of longitudinally expandable bellows-type seals.

3. Device in accordance with claim 1, wherein the two sections are disposed at right angles to each other, the inner pipe of the second section having its opening in a cylindrical chamber in the line of extension of said first section and containing said sealing-off member, said sealing-off member being provided with means for guiding the movement thereof within said chamber.

4. Device in accordance with claim 3, wherein said chamber is provided with an annular shoulder which constitutes said means for cooperating with the second section.

References Cited

UNITED STATES PATENTS 3,195,564   7/1965   Carney et al. _____ 137—375
3,263,622   8/1966   Tyree et al. _____ 62—45 XR

FOREIGN PATENTS 1,249,396   11/1960   France.

HENRY T. KLINKSIEK, *Primary Examiner.*